July 14, 1959     F. M. TOMLIN     2,894,656
GUARDS AND LOCATORS FOR ELECTRICAL OUTLET WALL BOXES
Filed Aug. 13, 1958     2 Sheets-Sheet 1
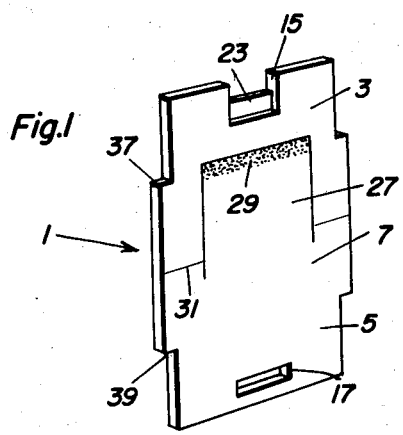
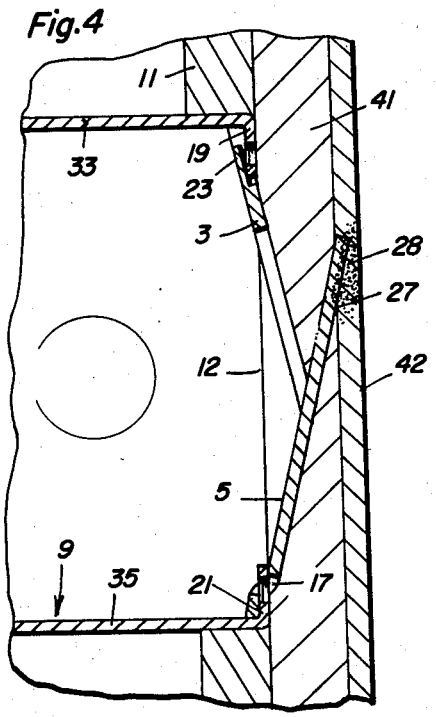
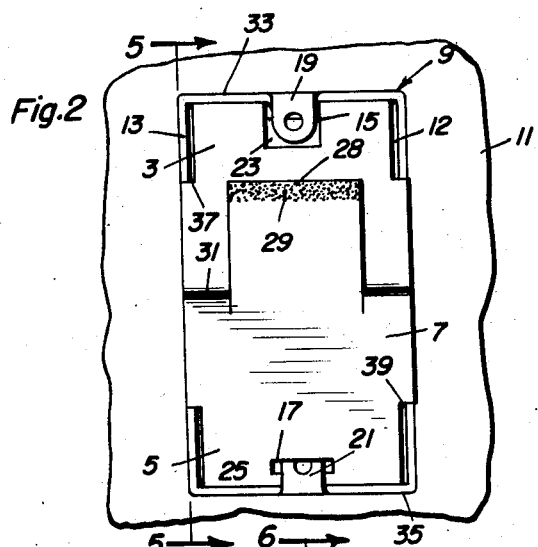
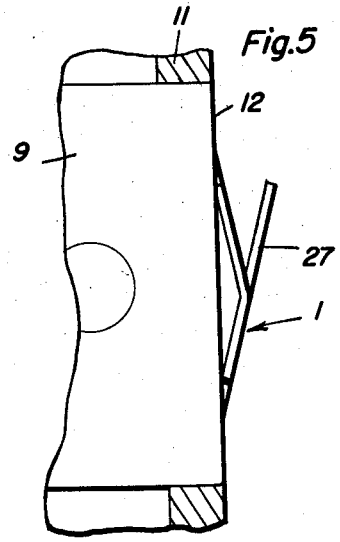
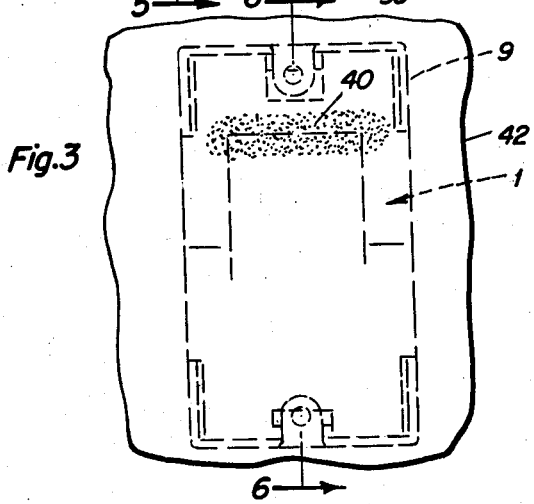
Frederick M. Tomlin
INVENTOR.

July 14, 1959 F. M. TOMLIN 2,894,656
GUARDS AND LOCATORS FOR ELECTRICAL OUTLET WALL BOXES
Filed Aug. 13, 1958 2 Sheets-Sheet 2
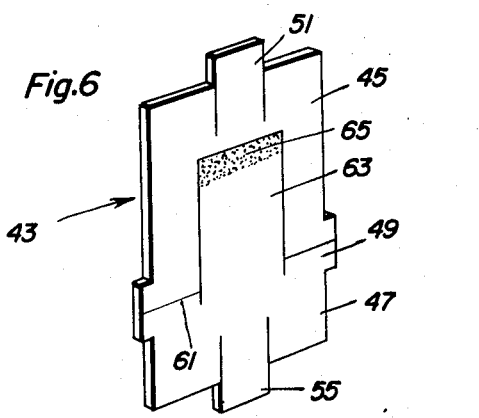
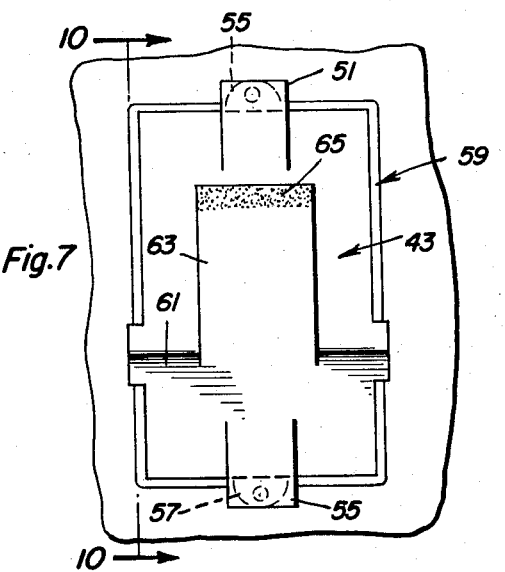
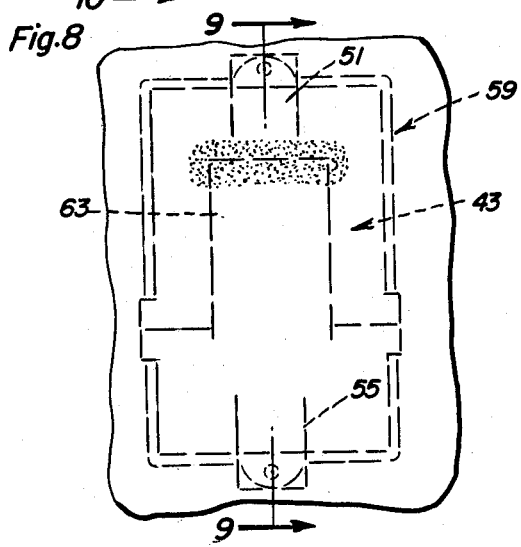
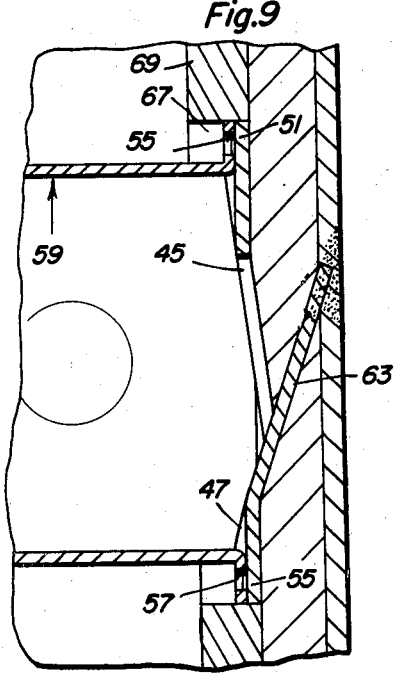
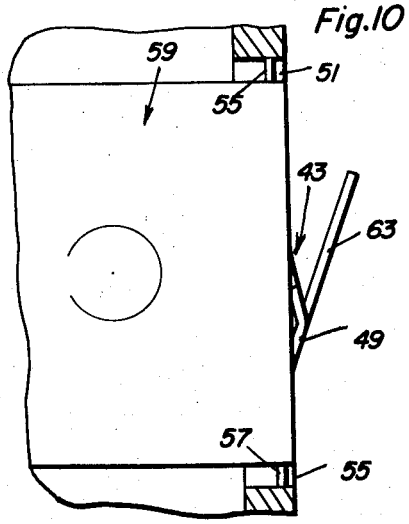
Frederick M. Tomlin
INVENTOR.

United States Patent Office
2,894,656
Patented July 14, 1959

2,894,656
GUARDS AND LOCATORS FOR ELECTRICAL OUTLET WALL BOXES

Frederick M. Tomlin, Detroit, Mich.

Application August 13, 1958, Serial No. 754,836

4 Claims. (Cl. 220—3.4)

This invention relates to guards and locators for preventing electrical outlet wall boxes, when installed with the fronts open, from being partly filled with plaster when buried during plastering, and for locating such buried boxes and forming an opening in the plaster when damp for access to the buried boxes to install electrical parts therein, the invention being designed as an improvement over that forming the subject matter of U.S. Patent No. 2,620,080 dated December 2, 1952.

The primary object of this invention is to provide a one-piece guard and locator for covering the open front of electrical outlet boxes when buried behind plaster, and which embodies a die impregnated or coated tab which, if the guard is plastered over will discolor damp plaster with a ribbon-like mark whereby the box may be located so that upon scraping away the damp skim coat of plaster in front of the tab it may be grasped to pull the guard out through the plaster to uncover the box.

Another object is to provide a guard and locator, as in the foregoing, which is formed of foldable semi-resilient material for deforming or bending of the guard and locator to fit into the fronts of such boxes of different sizes, under tension, for use therein and for projection forwardly of the boxes to locate the tab forwardly of the boxes in position for discoloring the plaster at its outer or skim surface for grasping the tab, when partly exposed.

Still another object is to provide a guard and locator as in the foregoing which fits in the open front of electrical outlet wall boxes to retain the locator in place and also engages the front rim of such boxes to prevent the locator from being forced into the boxes during plastering over the guard and locator.

Still another object is to provide a guard and locator for the foregoing purposes which is adapted for stamping in one operation out of such inexpensive material as cardboard to reduce the cost of manufacture thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the guard and locator in the preferred embodiment thereof;

Figure 2 is a fragmentary view in front elevation of the same installed in the front of an electrical outlet box of one conventional type;

Figure 3 is a fragmentary view in front elevation, partly in broken lines, of the guard and locator installed in an electrical outlet box and covered with plaster;

Figure 4 is an enlarged fragmentary view in vertical section taken on the line 4—4 of Figure 3;

Figure 5 is a fragmentary view in vertical section taken on the line 5—5 of Figure 2;

Figure 6 is a perspective view of a modified embodiment of the guard and locator for another type of electrical outlet box;

Figure 7 is a fragmentary view in front elevation of the modified embodiment of the guard and locator installed in the other type of electrical outlet box;

Figure 8 is a fragmentary view in front elevation, partly in broken lines, of the modified embodiment of guard and locator and the box covered with plaster;

Figure 9 is a fragmentary view in vertical section taken on the line 9—9 of Figure 8, and Figure 10 is a fragmentary view in vertical section taken on the line 10—10 of Figure 7.

Referring by numerals to the accompanying drawings, and first to Figures 1 to 5, the guard and locator in the preferred embodiment thereof comprises an oblong, vertically elongated, plate, designated generally 1, of substantially cruciform shape, whereby the plate 1 is provided with upper and lower end portions, 3, 5 of like width and rectangular shape and with a wider intermediate central portion 7 between said end portions 3, 5.

The plate 1 is slightly longer than the height of a convention electrical outlet box of one type mounted in a wall 11. The end portions 3, 5 are of a width to fit with a slight clearance in the open front 12 of the box 9 and the intermediate central portion 7 is of the approximate width of the box 9 to bridge the rim 13 at the front 12 of the box. Also the end portion 3 is formed in its outer end edge with rectangular shaped notch 15, in vertical center of the plate 1 adapted to straddle the depending cover attaching, internal upper, apertured lug 19 in the front 12 of said boxes, and said end portions 3, is formed with countersunk bottom cross ledge 23. The end portion 5 is formed adjacent its outer end edge and in the vertical center of the plate 1 with a slot 17 adapted for insertion upwardly therethrough of the internal apertured, lower cover attaching lug 21 in the front 12 of said boxes.

A rectangular shaped pull tab 27 is cut out of the central portion 17 of the plate 1 and out of the upper end portion 3 and is attached to said plate 1 below the transverse center of the central portion 7 coplanar with said plate for a purpose presently seen, and is also provided with an upper free transverse edge 28 impregnated with a dry, or viscous dye 29 which, when moistened, will color damp plaster with a ribbon-like colored mark, and which may be of the type set forth in the aforesaid patent.

The plate 1 is formed of a semi-resilient deformable and bendable material such as heavy cardboard and is installed in the box 9 by bending it rearwardly along a transverse center line 31 to contract its end portions 3, 5 for extending into the front 12 of the box 9 with the ledge 23, positioned behind the upper lugs 19, the notch 15 straddling said lug 19 and the lower lug 21 inserted upwardly through the slot 17. When thus bent and installed, its upper and lower end portions 3, 5 will, preferably, seat against the upper and lower ends 33, 35 of the box 9 and the central portion 7 will form upper and lower transverse shoulders 37, 39 at opposite side edges of the panel 1 seating against the rim 13 of the box 9, all as shown in Figures 2, 4 and 5, to close the box 9 behind plaster 41 as shown in broken lines in Figure 3.

As best shown in Figures 4 and 5, in response to bending of the plate 1, the tab 27 will be projected forwardly out of the plane of the plate 1 in upwardly and forwardly inclined positions substantially coplanar with the lower end portion 5 to dispose the upper impregnated edge 28 close to or at the front face of a skim coat 42 on the plaster, whereby to mark the skim coat, as at 40, so that the box 9 may be located and the guard and locator removed to uncover the box 9 in the manner previously described. As will be clear, the shoulders 37, 39 prevent the plate 1 from being pushed into the box 9 by plaster being applied under pressure over the plate 1 and the ledge 23, and slot 17 prevent the end portions 3, 5 from springing outwardly of the box 9.

In installing the plate 1, the lower end portion is first inserted in the lower end 35 of the box 9 with the lug 21 inserted upwardly through the slot 17 and the plate 1 extending forwardly out of the box 9. The plate 1 is then swung upwardly on the lug 21 and deformed as described to enter its upper end portion 3 in the upper end 33 of the box 29 with the ledge 23 on said upper end behind the upper lug 19. When the plate 1 is installed, the bottom of the upper notch 15 is spaced from said lug 19. This is for the purpose of providing for installing the plate 1 in wall outlet boxes varying slightly in length due to manufacturing irregularities. In this connection, the outer end edges of the end portions 3, 5 may be spaced from the ends 33, 35 of the outlet box 9, of a given size, by cutting the plate 1 undersize so that it may be installed in outlet boxes smaller than that shown in Figures 2 and 3 in length. Thus, as will be seen, the plate may be held under tension by engagement of the outer edges of its end portion 3, 5 with the ends 33, 35 of an outlet box 9, or it may be held under tension solely by locating the ledges 23 behind the lugs 19 and the lug 21 in the slot 17.

In the modified embodiment shown in Figures 6 to 10, the guard and locator comprises a plate 43 like the plate 1 with the following exceptions. The upper end portion 45 is longer than the lower end portion 47, the wider intermediate portion 49 is offset downwardly of the transverse center of the plate 43, and a pair of upper and lower rectangular shaped tabs 51 53, are cut out of the end portions 45, 47 in the vertical center of the plate 43 and which extend outwardly beyond the outer edges of the end portions 45, 47 to fit, when the guard and locator is installed flat against external apertured upper and lower cover attaching lugs 55, 57 on the ends of a box 59 of another type to prevent such lugs from being filled with plaster when the box 59 is closed by the plate 43 and plastered over, as shown in broken lines in Figure 8. In this embodiment, the plate 43 is bent rearwardly along the line 61 in the transverse center of the intermediate portion 49 and the pull tab 63, corresponding to the tab 27 is impregnated with dye, as at 65 and projected out of the plate 43 as and for the same purpose as the tab 27. As best shown in Figure 9, the tabs 51, 53 fit in openings 67 provided in the wall 69 for the lugs 55, 57. Also, in this modified embodiment plate 45 is held under compression after being bent, by engagement of its end portions 45, 47 with the interior wall of the box 59.

In both of the described embodiments of the invention, the line of bending may be weakened, as by scoring, not shown, to indicate where the plate should be bent and the plate will flex when pulled out of the box through moist or wet plaster to form a hole in the plaster for access to the box, and in the case of the preferred embodiment shown in Figures 1 to 5 the end portions 3, 5 will flex toward each other to permit the ledge 23, to clear the lug 19, and the slot 17 to be pulled off the lug 21. In the modified embodiment the tabs 51, 53 flex outwardly to permit the end portions 45, 47 to be entered in the box 49.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Means for closing the open front of an electrical outlet wall box behind wet plaster and for locating said box comprising a vertically elongated plate of semi-resilient material having upper and lower end portions and an intermediate portion between said end portions, said plate being longer than an oblong outlet wall box and bendable at said intermediate portion along a transverse line to contract said end portions for insertion in the front and ends of such a box, said plate having a coplanar pull tab cut out of the same for pulling the plate out of an outlet box through wet plaster, said tab being attached to said intermediate portion below said line for swinging out of the plane of the plate into forwardly inclined position in response to bending of said plate whereby said tab will project close to the outer surface of wet plaster covering the plate, said tab having a free edge impregnated with a dry soluble dye for marking wet plaster to indicate the location of the box and plate behind wet plaster.

2. Means as in claim 1 wherein said intermediate portion is wider than said end portions to form outwardly extending shoulders at opposite side edges of the plate for seating against a rim of an outlet box to prevent said intermediate portion from being forced into an outlet box by pressure of plaster when being applied over the plate.

3. Means as in claim 1, one of said end portions having a rectangular outer edge notch for straddling an internal lug in one end of an outlet box and across ledges in said notch for engaging behind such lug to releasably hold said end portion in an outlet box, the other end portion having a slot therein for receiving another lug in the other end of an outlet box whereby to releasably hold said other end portion in the box.

4. Means as in claim 1 wherein said end portions are provided with flaps cut out of the same and extending outwardly beyond the end edges of said portions for flexing into flat engagement with apertured external lugs on the ends of an outlet box to cover such lugs behind wet plaster.

No references cited.